US006552651B2

(12) United States Patent
Ide

(10) Patent No.: US 6,552,651 B2
(45) **Date of Patent: *Apr. 22, 2003**

(54) RADIO COMMUNICATION DEVICE WITH FLEXIBLE INDICATING FUNCTION

(75) Inventor: Motoki Ide, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,633

(22) Filed: May 7, 1999

(65) Prior Publication Data

US 2002/0113688 A1 Aug. 22, 2002

(30) Foreign Application Priority Data

May 11, 1998 (JP) .......................................... 10-127748

(51) Int. Cl.[7] ............................ G08B 5/22; H04Q 1/30; H04Q 7/00

(52) U.S. Cl. ........................ 340/7.55; 340/7.1; 455/566

(58) Field of Search ............................... 340/7.55, 7.51, 340/7.1, 7.2, 7.28, 7.56, 7.43, 7.52; 455/566, 550, 575, 567

(56) References Cited

U.S. PATENT DOCUMENTS 4,646,081 A * 2/1987 Tsunoda .................... 340/7.52
4,975,694 A * 12/1990 McLaughlin ............... 340/7.55
5,758,088 A * 5/1998 Bezaire ...................... 709/232
5,801,640 A * 9/1998 Yoshizawa ................. 340/7.52
5,802,455 A * 9/1998 Nishiyama ................. 340/7.55

FOREIGN PATENT DOCUMENTS

GB 2 242 048 9/1991
JP 04-287525 10/1992

OTHER PUBLICATIONS

"Motorola Technical Developments," vol. 13, Jul. 1991. William J., "Visual Persuasion Display Pager".*

* cited by examiner

*Primary Examiner*—Vivian Chin
*Assistant Examiner*—James K Moore
(74) *Attorney, Agent, or Firm*—Sughrue Mion, PLLC

(57) ABSTRACT

A radio communication device enables a message received to be displayed by flexible format. The selective-calling receiver as a receiver comprises a radio section for demodulating the selective-calling signal with it received, a calling number storage section for storing therein a plurality of self-selective-calling numbers, an agreement detector for detecting whether or not demodulated selective-calling signal agrees with which one of the plurality of self-selective-calling signal, a memory for storing therein a plurality of calling separation information for separating whether message information following to self-selective-calling number and selective-calling number agreeing to be detected agree with which one of the plurality of self-selective-calling numbers, a indicator for displaying the message information, and a display measure for permitting message information within the memory to display on the indicator, wherein the display measure permits the message information to display on the indicator in accordance with prescribed display format determined beforehand in every selective-calling number.

13 Claims, 6 Drawing Sheets

RADIO COMMUNICATION DEVICE WITH FLEXIBLE INDICATING FUNCTION

BACKGROUND OF THE INVENTION

The present invention relates to a radio communication device, more particularly a radio communication device with flexible indicating function of reception message in the side of receiver thereof.

Description of the Prior Art

In conventional information service using a selective-calling receiver, a transmitting station transmits transmission information using a format in conformity with an indicator of the selective-calling receiver.

Consequently, when the service is intended to perform using a plurality of kinds of receivers, and the number of digits of an indicator on each of the receivers is different, the format should conform with the number of digits of the small indicator or software in the side of the receiver must be changed.

Furthermore, when the information service has already started using the selective-calling receiver, the receiver may not be used for new service, because of restriction of the number of digits of the indicator, and of display software in conformity with the number of digits.

SUMMARY OF THE INVENTION

In view of the foregoing, a first object of the present invention is to provide a radio communication device which enables a received message to be displayed in a flexible format.

Further, a second object of the present invention is to provide a radio communication device which enables a received message to be displayed in conformity with the number of digits of the indicator.

Furthermore, a third object of the present invention is to provide a radio communication device which enables a message received to be displayed in conformity with the number of digits specified by a transmission side.

Moreover, a fourth object of the present invention is to provide a radio communication device which enables a received message to be displayed in conformity with the number of digits which changes dynamically.

According to the present invention, a radio communication device comprises a radio section for receiving a selective-calling signal and message information wherein the selective-calling signal and the message information are demodulated as a received selective-calling number and a received message respectively, a calling number storage section for storing therein a plurality of selective calling numbers, a detector, connected to the calling number storage and the radio section, for detecting an agreement between the received selective-calling number and one of the plurality of selective calling numbers, a memory for storing a plurality of display formats corresponding to the plurality of selective calling numbers, an indicator for displaying the received message; and a display means, connected to the detector, the memory and the indicator, for selecting, from the plurality of display formats stored in the memory, a corresponding display format corresponding to the received selective-calling number, and displaying the received message on the indicator in the corresponding display format when the detector detects the agreement between the received selective calling number and the one of the plurality of selective calling numbers.

According to an aspect of the present invention, in the radio communication device the plurality of display format includes a first format, a number of digits of which conforms with the indicator, and the display means does not perform a line feed according to a line feed code within the received message.

According to another aspect of the present invention, in the radio communication device, the plurality of display format includes a second format for which the display means counts a number of digits of the received message, and when the number of digits of the received message is either smaller than or equal to a number of digits of the indicator, the display means permits the received message to be displayed on the indicator, line-feeding by a line feed code, while when the number of digits of the message information is larger than the number of digits of the indicator, the display means permits all of the received message to be displayed on the indicator, scrolling in a lateral direction.

According to another aspect of the present invention, in the radio communication device, when receiving a prescribed character string, the display means changes the corresponding display format into different one of the plurality of display format corresponding to the character string from halfway.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will be described in detail in accordance with the accompanying the drawings.

Figure 1:
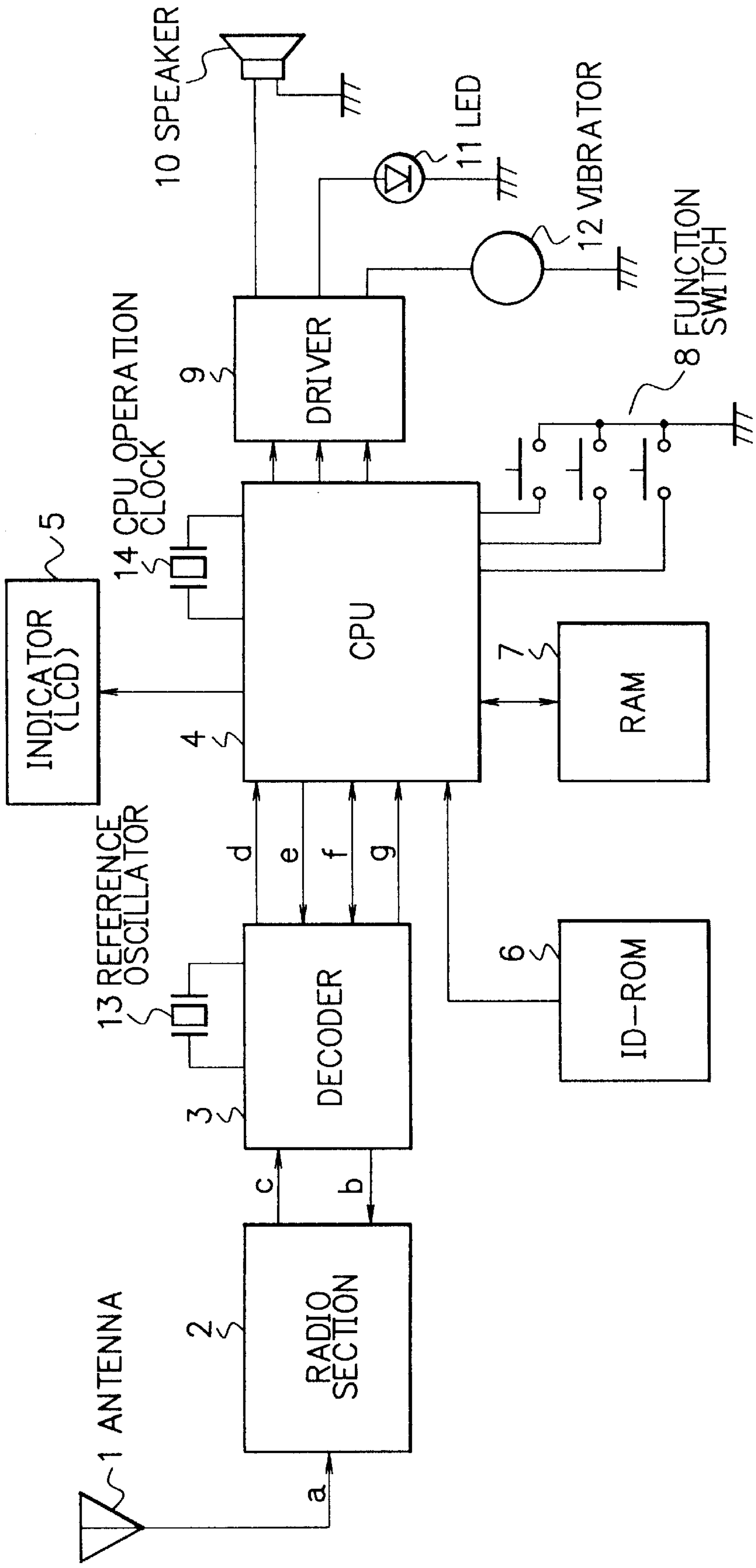
FIG. 1 is a block diagram showing a selective-calling receiver according to the present invention.

FIG. 1 is a block diagram showing one embodiment of a selective-calling receiver of the present invention.

A modulation signal (a) obtained from an antenna 1 is demodulated by a radio section 2.

The radio section 2 performs an intermittent reception operation according to a battery saving control signal (b) from a decoder 3.

One chip microcomputer 4 (hereinafter referring to a CPU) reads out a selective-calling number of the self-receiver stored in ID-ROM 6 (EEPROM) (electrically erasable and programmable read-only memory) and establishes it in the decoder 3 by a signal (e).

The decoder 3 compares the selective-calling number of the self-receiver and data (c) demodulated in the radio section 2. When the selective-calling number of the self-receiver agrees with the data (c), the decoder 3 outputs a detection signal of the selective-calling number to the CPU 4 using interrupt signal (d), address bus (e), and data bus (f) (hereinafter, collectively referring to (d); (e) and (f) as a CPU interface.) Subsequently, the decoder 3 carries out error correction of the transmitted data following the selective-calling signal, thus transferring only information bit to the CPU 4 using the CPU interface in every one code word (referring to FIG. 6).

Figure 6:
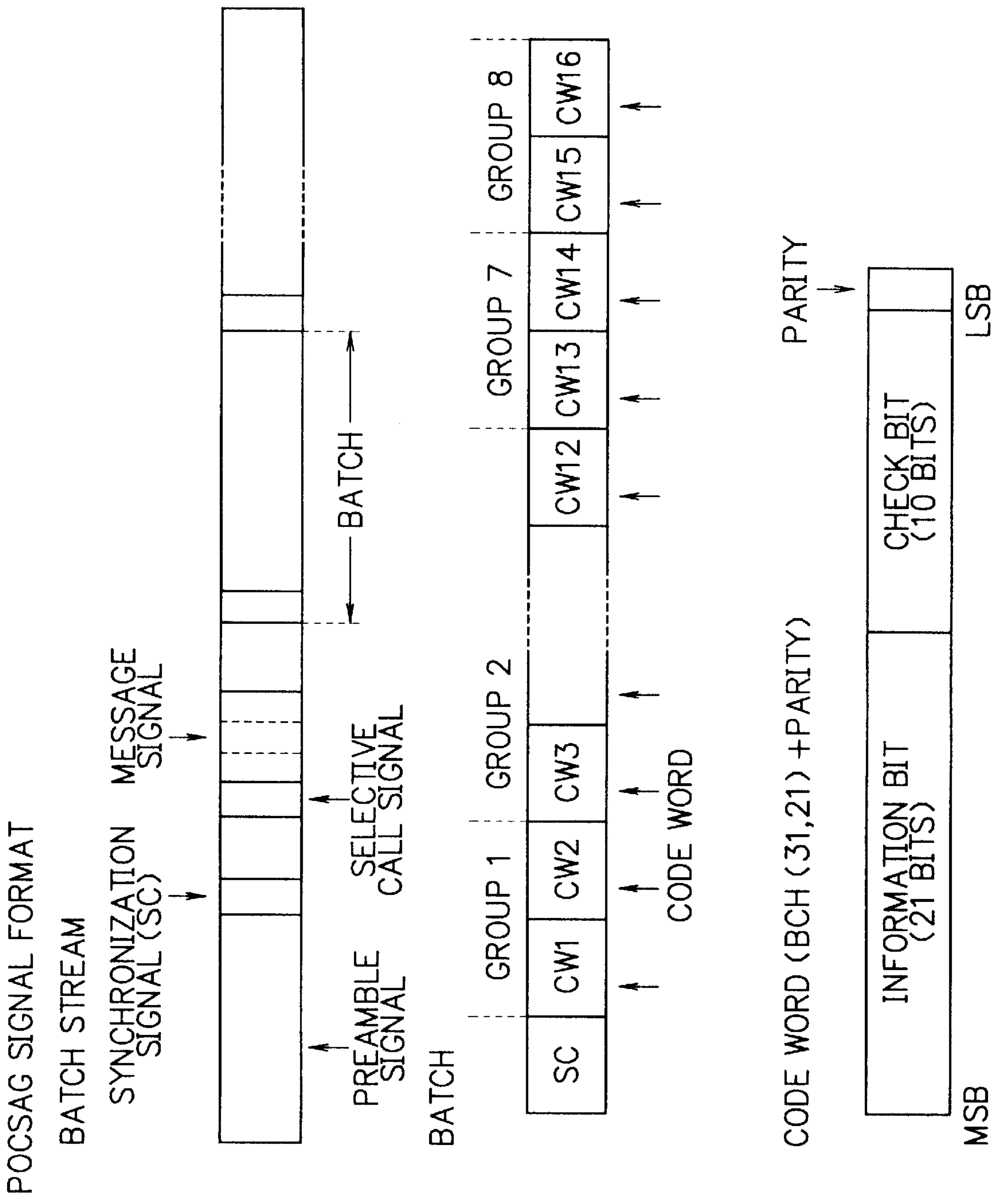
FIG. 6 is a view showing a format of POCSAG signal which is one example of fundamental form of a selective calling signal used to call the selective-calling receiver.

Further, a POCSAG signal format shown in FIG. 6 will be described. A batch stream consists of a preamble, a synchronization signal (SC), a selective calling signal, a message signal, and a batch. The preamble is a bit string in which "1010 . . . " continues by 576 bits. The synchronization signal is a signal for synchronizing with the code word (described later). The selective-calling signal is the number (selective-calling number) which is unique to respective selective-calling receivers and is encoded by BCH encoding. Thus, the MSB of the code word constituting the selective-signal is zero (0). The message signal is transmission message encoded by BCH encoding. Thus, the MSB of the code word constituting the message signal is one (1). One batch consists of the synchronization signal (SC), and a plurality of code words. A code word consists of parity and to BHC (31, 21) code.

The CPU 4 receives information of the selective-calling number from the decoder 3, and then store it in a RAM within the CPU 4 or an external RAM 7 as call discrimination information. Subsequently, when the data is transmitted successively from the decoder 3, the CPU 4 judges whether the data is message information or a selective-calling code.

When the data is the message information, the CPU 4 stores it in the RAM within the CPU 4 or in a buffer area within the external RAM 7. The CPU 4 performs the processing using a reference clock 13 (g) as an operation clock. When the data changes into the selective-calling code, the CPU 4 ceases from receiving the data, and simultaneously, triggers a CPU operation clock 14, so that the CPU 4 stores, in the message memory area within the external RAM 7, the data accumulated in the buffer as a message (character data), processing by using the CPU operation clock 14.

EMBODIMENT 1

Figure 2:
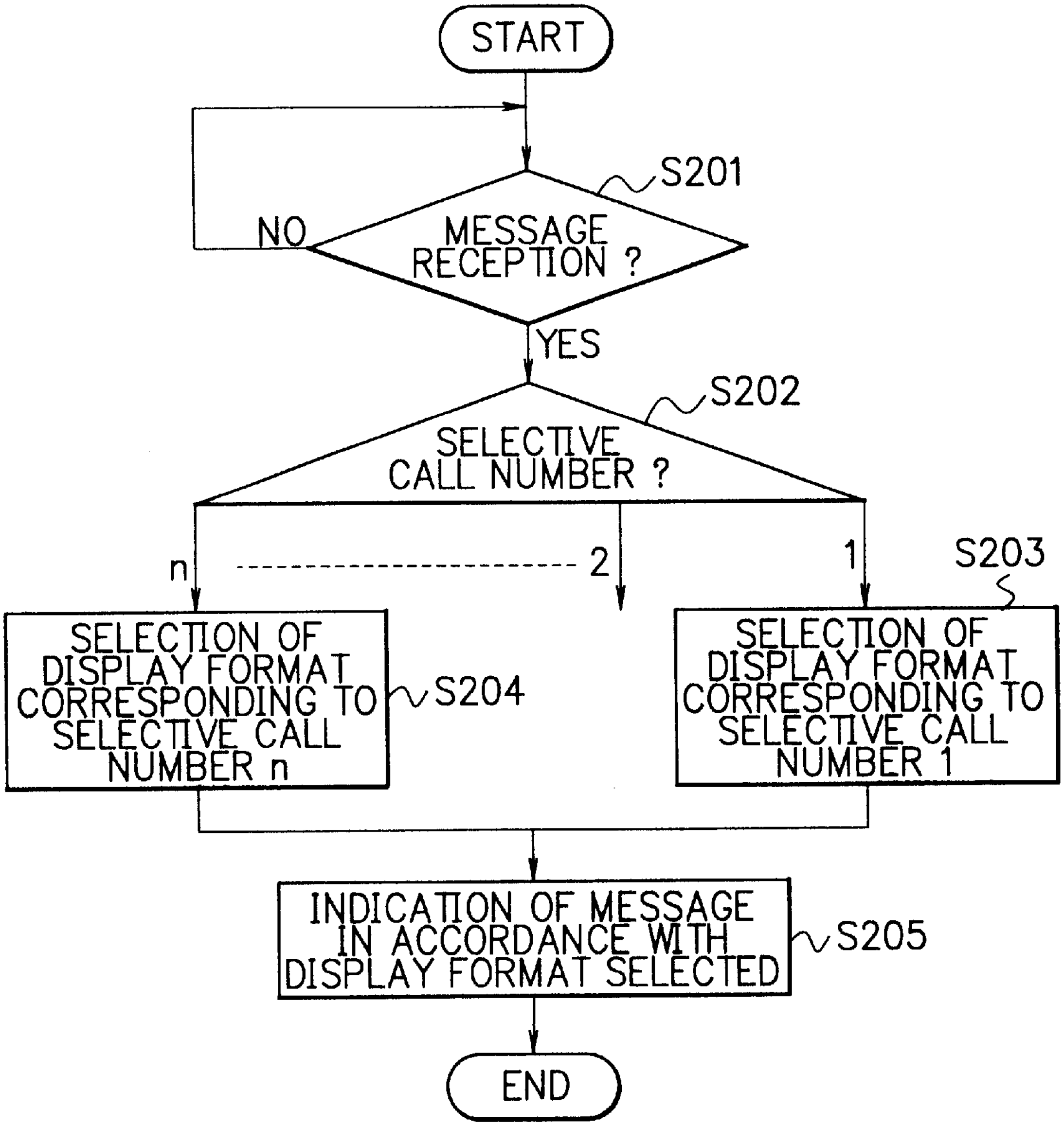
FIG. 2 is a flowchart showing a software for realizing a display means of the selective-calling receiver according to the embodiment 1 of the present invention.

FIG. 2 is a flowchart showing software for realizing display means of the selective-calling receiver according to the embodiment 1 of the present invention.

The software for realizing display means is a program of the CPU 4. The display means reads-out the selective calling number information of the received message from the RAM within the CPU 4 or the external RAM 7. The display means selects a corresponding display format in accordance with the read-out information of the selective-calling number. The display means displays the message according to the format selected.

Referring to FIG. 2, the receiver waits for reception of the message (STEP S201). When the message is received, the selective calling number (STEP S202) is judged. Subsequently, the display format corresponding to the selective-calling number (STEPs STEP S203 to STEP S204) is selected. Moreover, the message is displayed according to the selected display format (STEP S205).

EMBODIMENT 2

Figure 3:
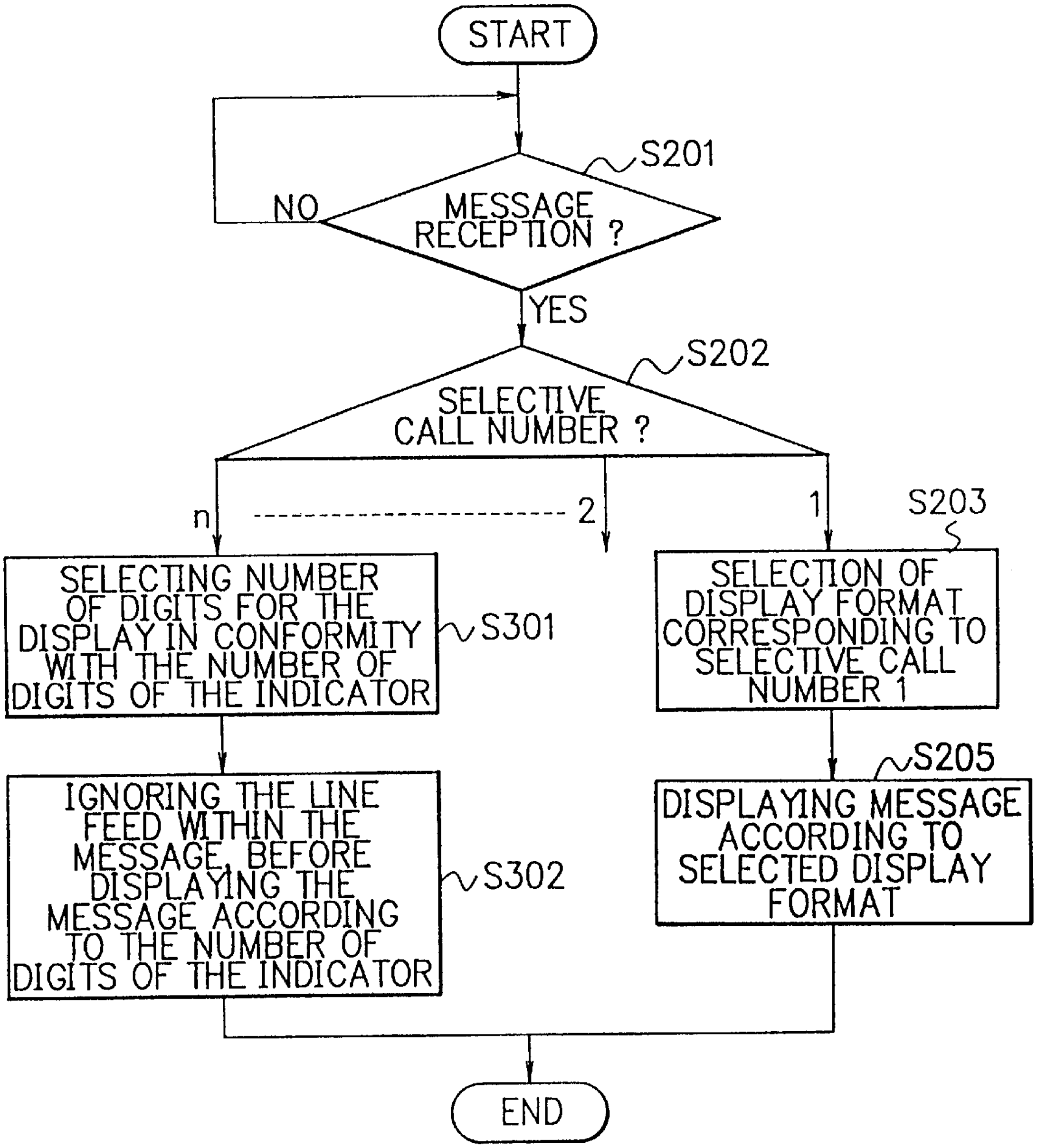
FIG. 3 is a flowchart showing a software for realizing a display means of the selective-calling receiver according to the embodiment 2 of the present invention.

FIG. 3 is a flowchart showing software for realizing display means of the selective-calling receiver according to the embodiment 2 of the present invention.

The software for realizing display means is a program of the CPU 4. The display means reads-out the information of the selective calling number of the received message from the RAM within the CPU 4 or the external RAM 7. The display means selects a display format according to the number of digits in conformity with a display screen of the side of the selective-calling receiver, as the display format selected in accordance with the information of the selective calling number.

At this time, the display means ignores a line feed code within the message received, and displays the message in conformity with the number of digits for the display of the selective-calling receiver.

Referring to FIG. 3, the receiver waits for reception of the message (STEP S201). When the message is received, the selective calling number (STEP S202) is judged. Subsequently, if the selective-calling number is any one of 1 to n−1, the display format is selected corresponding to the selective-calling number (STEP S203). The message is displayed according to the selected display format (STEP S205). While if the selective-calling number is n, the number of digits for the display in conformity with the number of digits of the indicator 5 is selected (STEP S301), thus the line feed within the message is ignored, and the message is displayed according to the number of digits of the indicator 5 (STEP S302).

EMBODIMENT 3

Figure 4:
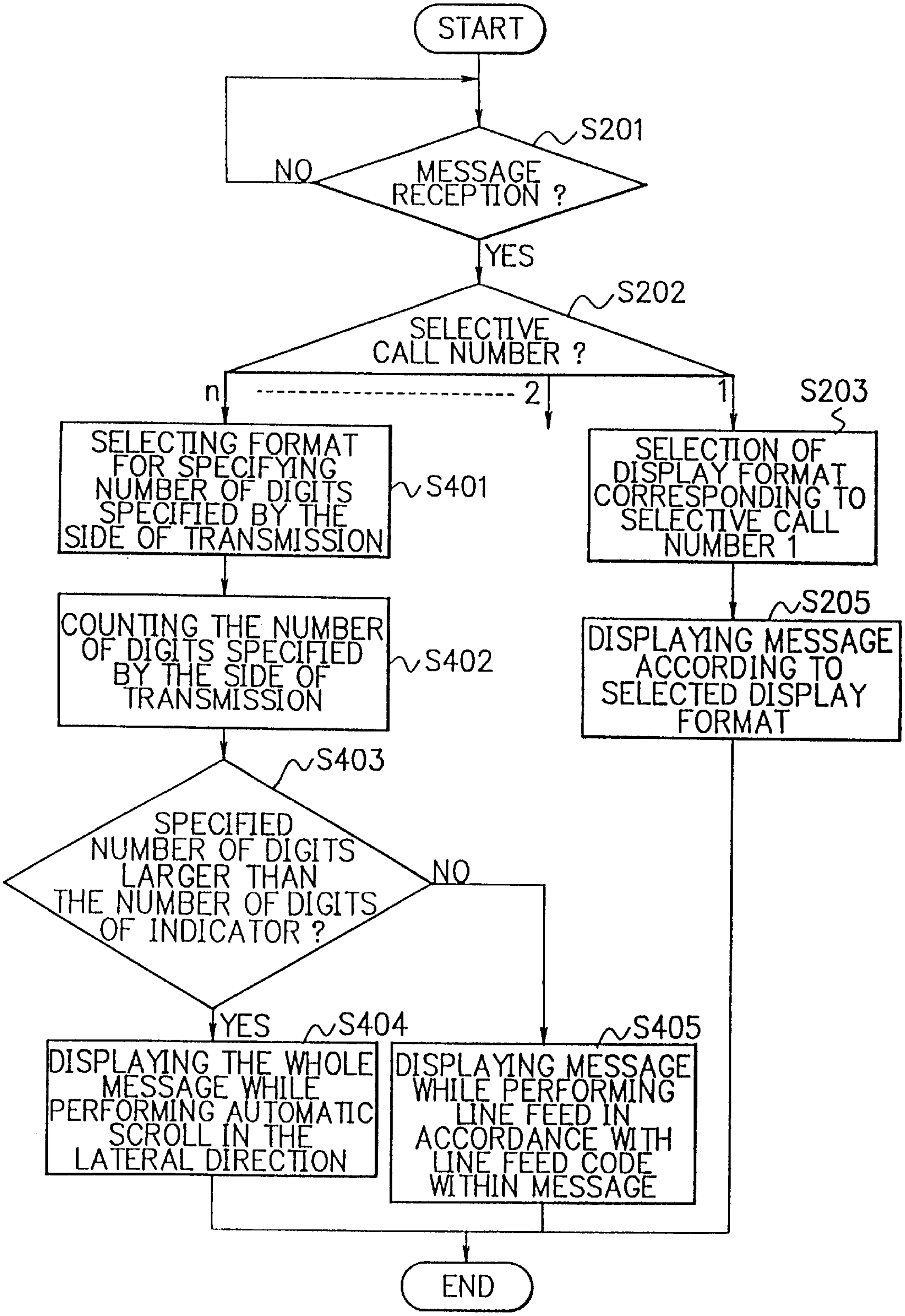
FIG. 4 is a flowchart showing a software for realizing a display means of the selective-calling receiver according to the embodiment 3 of the present invention.

FIG. 4 is a flowchart showing software for realizing display means of the selective-calling receiver according to the embodiment 3 of the present invention.

The software for realizing display means is a program of the CPU 4. The display means reads-out the information of the selective-calling number of the received message from the RAM within the CPU 4 or the external RAM 7. The display means selects a display format in which the number of digits for the display is determined and transmitted with line feed code, by as a display format selected in accordance with the read-out information of the selective-calling number by the transmission side.

At this time, the display means counts the number of digits of the received message. When the number of digits of the message is smaller than the number of digits of the display screen, the display means carries out line feeding based on line feed code to display the message, while when the number of digits of the message is larger than the number of digits of the display screen, the whole message is displayed, automatically scrolling the whole messages in the lateral direction.

Referring to FIG. 4, the receiver waits for reception of the message (STEP S201). When the message is received, the selective-calling number (STEP S202) is judged. Subsequently, if the selective-calling number is any one of 1 to n−1, the display format corresponding to the selective-calling number is selected (STEP S203) and then the message is displayed according to the selected display format (STEP S205). On the other hand, if the selective-calling number is n, the number of digits specified by the transmission side (STEP S401) is selected, before counting the number of digits specified by the transmission side (STEP S402). Then, it is judged whether or not the number of digits specified by the side of transmission is larger number than the number of digits of the indicator 5 (STEP S403). In case of the larger number, the display means displays the whole message, automatically scrolling it in the lateral direction regarding the whole message (STEP S404), while when the number of digits specified by the transmission side is smaller number than the number of digits of the indicator 5, the display means displays the message, performing line-feed in accordance with the line feed code within the message (STEP S405).

EMBODIMENT 4

Figure 5:
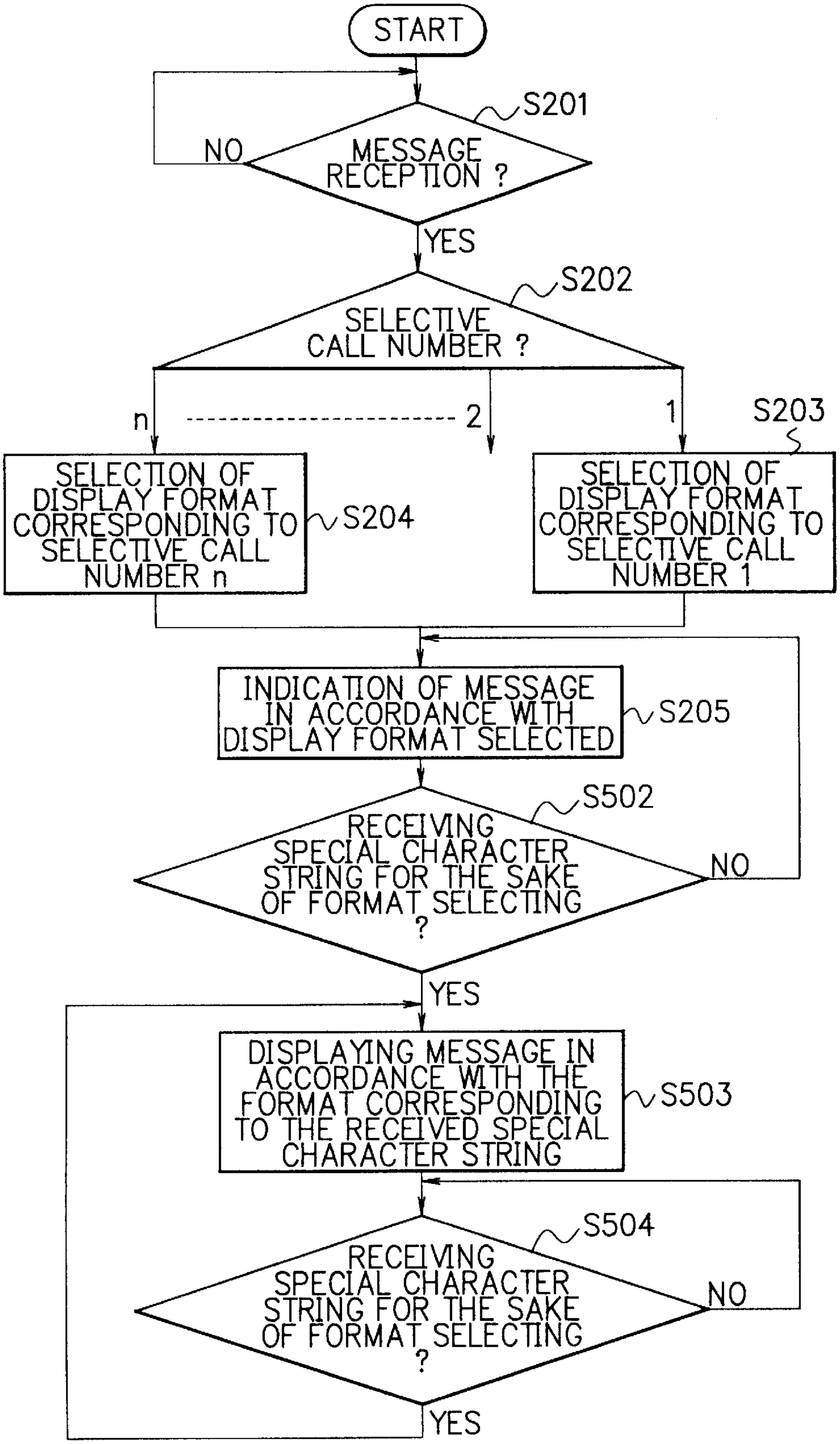
FIG. 5 is a flowchart showing a software for realizing a display means of the selective-calling receiver according to the embodiment 3 of the present invention.

FIG. 5 is a flowchart of software for realizing display means of the selective-calling receiver according to the embodiment 4 of the present invention.

The software for realizing display means is a program of the CPU4. The display means reads-out the information of the selective calling number of the received message from the RAM within the CPU 4 or the external RAM 7. The display means selects a corresponding display format in accordance with the read-out information of the selective-calling number. The display means displays the message according to the selected format.

When, the display means receives a predetermined prescribed special character string while receiving the message, the display means changes the selected format to a display format corresponding to the special character string to be changed from halfway.

For instance, the display means permits a selective-calling number 1 to correspond to the format for displaying the number of digits in conformity with the display screen of the side of the selective-calling receiver (hereinafter referring to format 1), described in FIG. 3, while the display means permits the selective-calling number 2 to correspond to the format which is capable of determining the number of digits of the display in the transmission side by adding the line feed code from the side of the transmission (hereinafter referring to format 2).

Further, the display means permits the special character string ">" to correspond to the format 1, and the special character string "--" to correspond to the format 2.

Even though a service company of the selective-calling receiver provides news information in accordance with the format 1 using the selective-calling number 1, it is capable of being transmitted a score table of a base ball game in accordance with the format 2 from halfway using the same selective-calling number by placing the special character string "--" in front of the message of the score table.

Referring to FIG. 5, the receiver waits for reception of the message (STEP S201). When the message is received, thus the selective calling number is judged (STEP S202). Subsequently, the display format is selected corresponding to the selective-calling number (STEPs S203 to S204). The message is displayed according to the selected display format (STEP S205).

Next, it is determined whether or not the selective-calling receiver receives the special character string for the sake of format selecting (STEP S502). When the selective-calling receiver receives the special character string, proceed to STEP S503, while when the selective-calling receiver does not receive the special character string, return to STEP S205.

In STEP S503, the display means displays the message in accordance with the format corresponding to the received special character string. Next, it is determined whether or not the display means receives the special character string for the sake of format selecting (STEP S504). If the display means receives the special character string, return STEP S503, while if the display means does not receive the special character string, return to STEP S504.

Further, it is possible to commence the processing from the STEP S502, after performing processing of FIG. 3 or FIG. 4.

As mentioned above, according to the present invention, the selective-calling receiver is provided with the display means for realizing at least plural kinds of display formats, thus the selective-calling receiver is capable of changing the display format dynamically in accordance with the specified character included in the message or the received information of the selective-calling number.

Further, according to the present invention, it is possible to select the display format of information service by the transmission side independently so that it is possible to select the most suitable display format for the content of the service, which used to depend on a display screen of the conventional selective-calling receiver side, thus value of the information service is added.

Furthermore, manufacturers of the selective-calling receivers are not forced to use the fixed number of digits common to the respective makers, so that there is the effect that the width of commodity planning of the selective-calling receivers increases.

While preferred embodiments of the invention have been described using specific terms, the description has been for illustrative purpose only, and it is to be understood that changes and variations may be made without departing from the spirit or scope of the following claims.

What is claimed is:

1. A radio communication device comprising:

a radio section for receiving a selective-calling signal and message information wherein said selective-calling signal and said message information are demodulated as a received selective-calling number and a received message respectively;

a calling number storage section for storing therein a plurality of selective calling numbers;

a detector, connected to said calling number storage and said radio section, for detecting an agreement between said received selective-calling number and one of said plurality of selective calling numbers;

a memory for storing a plurality of display formats corresponding to said plurality of selective calling numbers;

an indicator for displaying said received message; and a display means, connected to said detector, said memory and said indicator, for selecting, from said plurality of display formats stored in said memory, a corresponding display format corresponding to said received selective-calling number, and displaying said received message on said indicator in said corresponding display format when said detector detects said agreement between said received selective calling number and said one of said plurality of selective calling numbers, wherein at least one of the display formats is based on characteristics of the indicator, said characteristics including the number of digits of the indicator.

2. A radio communication device according to claim 1, wherein said plurality of display formats includes a first format, a number of digits of which conforms with said indicator, and said display means does not perform a line feed according to a line feed code within said received message.

3. A radio communication device according to claim 2, wherein said display means, when receiving a prescribed character string, changes said corresponding display format into a different one of said plurality of display formats.

4. A radio communication device according to claim 3, wherein the different display format corresponds to a display format assigned to said character string.

5. A radio communication device according to claim 1, wherein said plurality of display formats includes a display format for which said display means counts a number of digits of said received message, and when the number of digits of said received message is either smaller than or equal to a number of digits of said indicator, said display means permits said received message to be displayed on said indicator, line-feeding by a line feed code, while when the number of digits of said received message is larger than the number of digits of said indicator, said display means permits all of said received message to be displayed on said indicator, scrolling in a lateral direction.

6. A radio communication device according to claim 1, wherein said display means, when receiving a prescribed character string, changes said corresponding display format into a different one of said plurality of display formats.

7. A radio communication device according to claim 6, wherein the different display format corresponds to a display format assigned to said character string.

8. A radio communication device comprising:

a radio section for receiving a selective-calling signal and message information wherein said selective-calling signal and said message information are demodulated as a received selective-calling number and a received message respectively;

a calling number storage section for storing therein a plurality of selective calling numbers;

a detector, connected to said calling number storage and said radio section, for detecting an agreement between said received selective-calling number and one of said plurality of selective calling numbers;

a memory for storing a plurality of display formats corresponding to said plurality of selective calling numbers;

an indicator for displaying said received message; and a display means, connected to said detector, said memory and said indicator, for selecting, from said plurality of display formats stored in said memory, a corresponding display format corresponding to said received selective-calling number, and displaying said received message on said indicator in said corresponding display format when said detector detects said agreement between said received selective calling number and said one of said plurality of selective calling numbers, wherein said plurality of display formats includes a format for which said display means counts a number of digits of said received message, and when the number of digits of said received message is either smaller than or equal to a number of digits of said indicator, said display means permits said received message to be displayed on said indicator, line-feeding by a line feed code, while when the number of digits of said received message is larger than the number of digits of said indicator, said display means permits all of said received message to be displayed on said indicator, scrolling in a lateral direction.

9. A radio communication device according to claim 8, wherein said display means, when receiving a prescribed character string, changes said corresponding display format into a different one of said plurality of display formats corresponding to said character string at a point halfway through the character string.

10. A radio communication device according to claim 8, wherein said display means, when receiving a prescribed character string, changes said corresponding display format into a different one of said plurality of display formats.

11. A radio communication device according to claim 10, wherein the different display format corresponds to a display format assigned to said character string.

12. A radio communication device comprising:

a radio section for receiving a selective-calling signal and message information wherein said selective-calling signal and said message information are demodulated as a received selective-calling number and a received message respectively;

a calling number storage section for storing therein a plurality of selective calling numbers;

a detector, connected to said calling number storage and said radio section, for detecting an agreement between said received selective-calling number and one of said plurality of selective calling numbers;

a memory for storing a plurality of display formats corresponding to said plurality of selective calling numbers;

an indicator for displaying said received message; and a display means, connected to said detector, said memory and said indicator, for selecting, from said plurality of display formats stored in said memory, a corresponding display format corresponding to said received selective-calling number, and displaying said received message on said indicator in said corresponding display format when said detector detects said agreement between said received selective calling number and said one of said plurality of selective calling numbers, wherein said display means, when receiving a prescribed character string, changes said corresponding display format into a different one of said plurality of display formats corresponding to said character string at a point halfway through the character string.

13. A radio communication device comprising:

a radio section for receiving a selective-calling signal and message information wherein said selective-calling signal and said message information are demodulated as a received selective-calling number and a received message respectively;

a calling number storage section for storing therein a plurality of selective calling numbers;

a detector, connected to said calling number storage and said radio section, for detecting an agreement between said received selective-calling number and one of said plurality of selective calling numbers;

a memory for storing a plurality of display formats corresponding to said plurality of selective calling numbers;

an indicator for displaying said received message; and a display means, connected to said detector, said memory and said indicator, for selecting, from said plurality of display formats stored in said memory, a corresponding display format corresponding to said received selective-calling number, and displaying said received message on said indicator in said corresponding display format when said detector detects said agreement between said received selective calling number and said one of said plurality of selective calling numbers, wherein said plurality of display formats includes a first format, a number of digits of which conforms with said indicator, and said display means does not perform a line feed according to a line feed code within said received message, and wherein said display means, when receiving a prescribed character string, changes said corresponding display format into a different one of said plurality of display formats corresponding to said character string at a point halfway through the character string.

* * * * *